July 21, 1931.  H. A. WINNE  1,815,754
SYSTEM OF ELECTRIC CONTROL
Filed Oct. 27, 1928
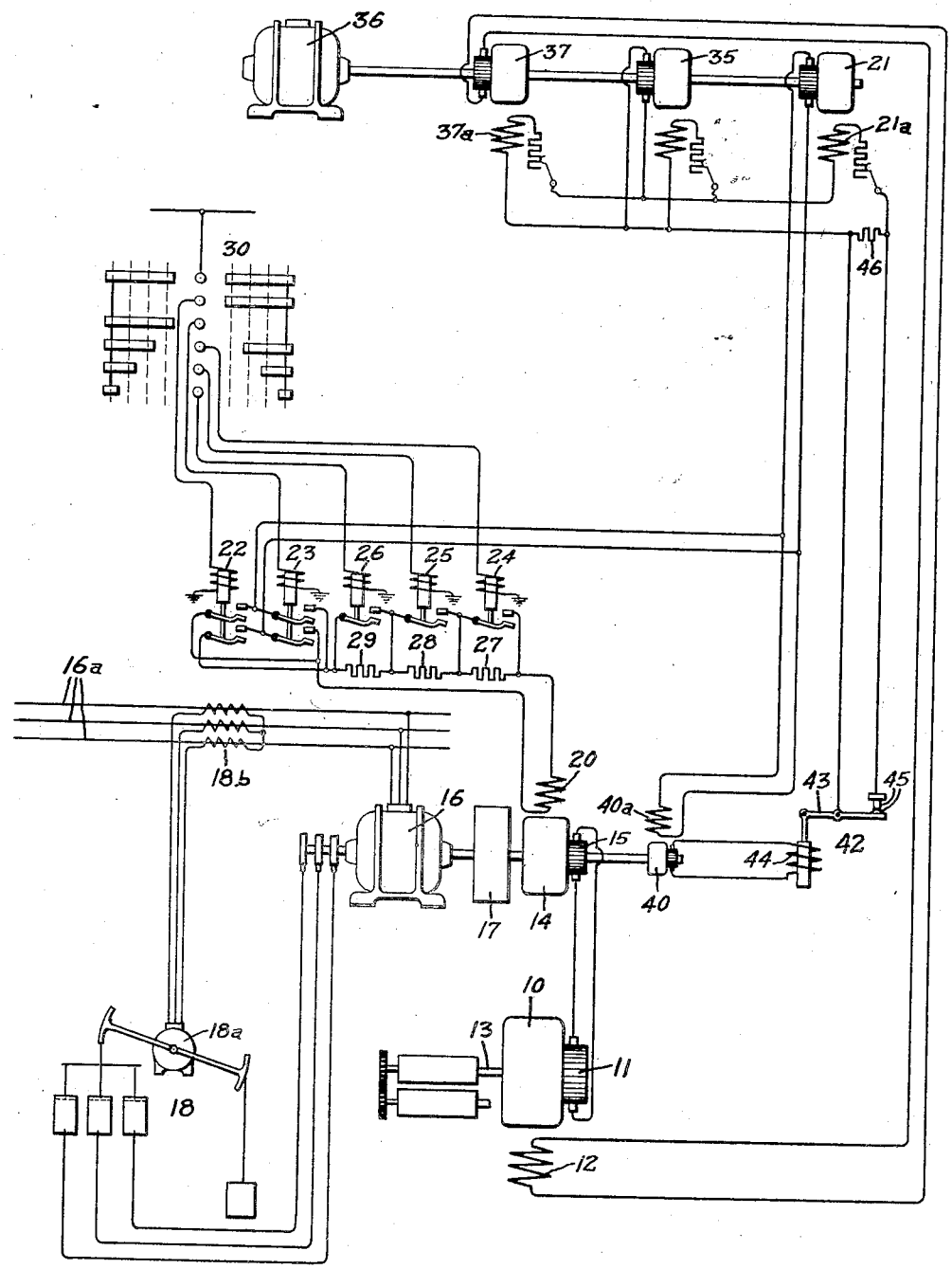
Inventor:
Harry A. Winne
by Charles E. Tullar
His Attorney Patented July 21, 1931

1,815,754

UNITED STATES PATENT OFFICE

HARRY A. WINNE, OF SCHENECTADY, NEW YORK, ASSIGNOR TO GENERAL ELECTRIC COMPANY, A CORPORATION OF NEW YORK

SYSTEM OF ELECTRIC CONTROL

Application filed October 27, 1928. Serial No. 315,508.

My invention relates to electrical control systems for dynamo-electric machines, more particularly to control systems for electric machines operating in what is known as the Ward-Leonard system, in which a separately excited generator has its armature connected in a local circuit with the armature of a separately excited motor, and has for its object the provision of such a control system which is of simple and improved construction and which is convenient and efficient in operation.

Although it obviously has other applications, my invention is particularly useful in connection with reversing rolling mill equipment, hoisting equipments and the like.

Direct current motors electrically supplied by motor generator sets and controlled in accordance with the Ward-Leonard system are particularly suitable for driving mills, hoists and like apparatus, the direction of rotation of which must be very frequently reversed The Ward-Leonard system of control is extremely flexible and permits of easily reversing the direction of rotation of the motor and controlling its speed of operation.

In the operation of reversing rolling mills, such as blooming mills which roll large steel ingots into smaller blooms, the load on the motor driving the mill is extremely fluctuating in character. For example, while the ingot is actually between the rolls of the mill, and being reduced in size, the load on the motor may be extremely high, particularly if, as is often the case, the motor is accelerating the mill and metal at the same time. This means a correspondingly heavy power demand on the generator which supplies the motor. On the other hand, after the metal leaves the rolls and while the motor is being decelerated preparatory to reversal, power will actually be fed back from the motor into the generator due to the inertia of the motor and mill. This means that during various portions of the rolling cycle the generator is alternately called upon to deliver extremely heavy outputs as a generator and to act as a motor pumping power back into the power system.

A load of this extremely fluctuating character is not a desirable load for an electric power supply system and consequently in order to make the load on the system more uniform and to reduce the value of the peak loads on the system, it is usual to provide a flywheel on the motor generator which supplies power to the reversing motor. In this case the generator will be driven by an induction motor with controlling means so arranged that when the load on the induction motor, and consequently on the power system, tends to exceed a predetermined value, the set will slow down, allowing the flywheel to give up a portion of its kinetic energy to help carry the load on the generator and relieve the power system from the maximum peak. During periods of light load, the induction motor will speed up the set and flywheel, restoring the kinetic energy which was given up during the periods of heavy load. Consequently, in a system of this character the speed of the flywheel motor-generator set is continually varying up and down through a considerable range.

It will be understood that in the operation of such a reversing mill drive the operator controls the speed and direction of rotation of the mill by means of a master controller which adjusts the excitation of the generator, and may also adjust the excitation of the motor to obtain still higher speeds. It is very desirable that for any given setting of the master controller, the speed of the mill motor should not be affected by variations in the speed of the flywheel set.

In one of its aspects, my invention contemplates the provision of electrical control means whereby the excitation of the main generator will be adjusted to compensate for changes in the speed of the generator so that for any given setting of the master controller a substantially constant generator terminal voltage will be obtained regardless of the speed fluctuation of the flywheel motor-generator set.

In carrying my invention into effect in one form thereof, I provide the generator, which is utilized to electrically supply the mill operating motor, with a separate exciter and control this exciter so as to vary the generator field in response to some condition of operation of the generator in such manner that the terminal voltage of the generator will be preserved at a substantially constant value. I conveniently cause the excitation of the generator to vary in dependence upon some operating condition of the generator by providing a pilot generator having a voltage field-current characteristic substantially similar to that of the generator. The generator excitation is then regulated directly by means controlled responsively to a condition of operation of the pilot generator.

For a more complete understanding of my invention reference should be had to the accompanying drawing in which the single figure is a diagrammatic representation of a system of electrical control embodying my invention.

Referring to the drawing I have shown my invention in one form as applied to a direct current motor employed to operate a reversing blooming mill, the motor being electrically supplied from a flywheel motor-generator set in accordance with the Ward-Leonard system of control. As shown, a direct current motor 10, provided with an armature 11 and a separately excited field winding 12 is mechanically connected by means of a shaft 13 to operate a reversing blooming mill (not shown). A suitable direct current generator 14 is provided to electrically supply the motor 10. As shown, the generator armature 15 is electrically connected with the motor armature 11 so that the generator serves to supply the motor armature current in accordance with the Ward-Leonard system.

A suitable induction motor 16 supplied from a suitable source of alternating current 16a is provided for operating the generator 14. As previously explained, in order to cause the load in the alternating current system 16a to be more uniform, and in order to reduce the value of the maximum load imposed upon this system during the rolling operation, a suitable flywheel 17 is provided. The generator 14, induction motor 16 and flywheel 17 are mounted upon a common shaft so that both the generator and flywheel are directly operated by means of the induction motor. In order to permit the motor-generator set to slow down under heavy loads and thus give up a portion of the stored energy of the flywheel and associated rotating parts, a suitable regulator, shown as a liquid slip regulator 18, is provided for the induction motor. As is well understood, should the current input to the induction motor 16 tend to exceed the value for which the slip regulator is adjusted, the torque of the torque motor 18a, which is proportional to the current supplied to it by the series transformer 18b, will be sufficient to lift the movable electrodes of the regulator, thereby increasing the resistance in the secondary circuit of the induction motor. As a result of this operation, the flywheel set will slow down somewhat so as to permit the flywheel and associated rotating parts to give up a portion of their stored energy. Thus, kinetic energy which is stored during periods of light loads will be expended during periods of excessive loads so as to relieve the induction motor and power system.

The generator 14 is provided with a field 20 excited from a suitable source, shown as a generator exciter 21. As is well understood, the speed of the reversing motor 10 and its direction of operation will be controlled by suitably controlling the strength and polarity of the excitation of the generator field 20. Field control means are provided therefore, in order to conveniently control the excitation of the field 20 both as to its strength and direction of its polarity. Suitable directional contactors 22 and 23 are provided to control the polarity of the field 20, and thus the direction of operation of the motor 10, while suitable contactors 24, 25 and 26 are provided to control blocks of resistances 27, 28 and 29 respectively, which are inserted in series with the field 20, so that the field strength may be readily controlled and thus, the speed setting of the motor 10 be readily adjusted.

The reversing contactors 22 and 23 and the resistance controlling contactors 24, 25 and 26 are controlled in a well-known manner by means of a suitable drum controller 30. By referring to the drawing it will be understood that movement of the controller towards the left will first energize the contactor 22 so as to cause the motor 10 to operate in one direction. Continued movement of the controller toward the left, as viewed in the figure, will successively energize the operating coils of the contactors 24, 25 and 26 so as to successively short circuit the resistances 27, 28 and 29 and thus cause the motor speed to increase accordingly. Movement of the controller in the opposite direction reverses the polarity of the generator field 20 and thus the direction of the operation of the motor. The speed setting of the motor while operating in this direction will likewise be determined by the setting of the controller 30.

As is well understood should the voltage of the generator 14 be brought up to its full rated value, the speed of the motor 10 may still be further increased by decreasing the excitation of its field 12 in any well-known manner.

It will be understod that if the excitation for the generator were obtained through the adjustable resistance from a constant voltage source, the generator excitation would have a constant value for any given setting of the master controller 30 and consequently, the generator voltage would vary proportionally with the speed of the flywheel motor-generator set. In consequence thereof, for any given setting of the master controller, the speed of the mill motor itself would vary as the speed of the motor-generator set varied. This means that if the equipment were subjected to a series of heavy loads in rapid succession and the flywheel set slowed down a considerable amount in order to obtain sufficient energy from the flywheel to relieve the power system, the speed of the mill motor would be correspondingly decreased, thus causing the operation of the whole mill to be slowed up whereby the amount of steel that could be rolled in a given time would be materially reduced.

Thus, it is very desirable to maintain the speed of the motor 10 constant for any speed setting of the controller 30 and in order to effect this constant speed operation of the motor 10, I suitably vary the excitation of the generator 14 so as to cause its terminal voltage to remain substantially constant even though its speed fluctuates over a considerable range.

In order to so vary the excitation of the generator 14 I vary the excitation of the exciter 21 in response to some operating condition of the generator, namely, its operating speed.

As shown, I provide a suitable source of constant voltage for energizing the excitating winding 21a of the exciter 21 and modify its effect on the excitation of the exciter in response to the generator operating condition referred to above. As shown, I provide a self excited exciting generator 35 for energizing the field winding 21a of the exciter 21. It will be understood however, that any substantially constant direct current source of electrical supply may be employed to energize these field windings. I conveniently operate the exciter 21 which supplies the generator field winding 20, and the exciter 35 which supplies the exciter field winding 21a at constant speeds by means of any suitable constant speed motor, shown as an induction motor 36. I likewise conveniently utilize the induction motor 36 as a source of power for the exciter 37, which I utilize to energize the field winding 12 of the reversing motor 10. As shown, I conveniently energize the field winding 37a of the exciter 37 by means of the exciter 35. It will be understood that any other suitable source of direct current electrical supply may be employed to excite the field winding 12 of the motor 10.

It will be observed that since the exciter 35 is being operated at a substantially constant speed, by means of the induction motor 36, it will serve to supply a substantially constant voltage source of excitation for the machine 21, and thus since the machine 21 is being operated at a substantially constant speed, it will tend to supply a substantially constant voltage source of excitation for the generator 14. The excitation for the generator 14, however, is to be so varied that it will maintain a substantially constant generator terminal voltage irrespective of the generator speed. I conveniently and economically effect this variation in the generator excitation by modifying the exciting effect of the machine 35 upon the field winding 21a of the exciter 21 in accordance with the generator operating condition referred to, that is, in accordance with the generator speed.

In order to so modify the exciting effect of the machine 35, I provide a suitable pilot generator 40 driven in synchronism with the generator 14. As shown, I conveniently mount the pilot generator 40 directly upon the generator shaft. It will be understood, however, that the pilot generator 40 may be geared to this shaft or otherwise suitably connected so as to be driven in synchronism therewith. Thus, as the speed of the flywheel generator set fluctuates, the speed of the pilot generator 40 will fluctuate in like manner. I further utilize the exciter 21 as a source of energization for the field winding 40a of the pilot generator 40.

It will be observed therefore, that if the pilot generator 40 have a field saturation characteristic similar to that of the main generator 14, and the exciting effect of the machine 35 be modified in accordance with an operating condition of the pilot generator so as to maintain a substantially constant terminal voltage thereof, the resultant effect upon the excitation of the generator 14 will likewise be such that it will maintain a substantially constant terminal voltage thereof.

In order to effect this modification in the excitation produced by the machine 35, I provide a suitable regulator 42 which I cause to respond directly to the pilot generator terminal voltage. This regulator may be of any well-known type, but for the purpose of illustration I have shown the regulator 42 comprising a pivoted bar 43 and a coil 44 having its core connected to the bar 43 at one end thereof. The pull of the coil 44 should vary with the speed of the pilot generator and consequently with the speed of the generator 14. In order to effect this proportionality I energize the coil directly across the pilot generator armature terminals. The regulator 42 operates to effect a variation in the strength of the field 21a of the exciter 21 and thus a variation in the excitation of the generator 14. As shown, the regulator 42 is provided with a pair of contacts 45 which serve to by-pass and insert a suitable resistance 46 connected in the circuit of the exciter field winding 21a.

It will be observed that when the contacts 45 are opened, the resistance 46 will be inserted in the field winding circuit and the excitation of the machine 21 will be decreased accordingly, and that when the contacts 45 are closed, the resistance 46 will be shunted and the excitation of the machine 21 increased accordingly. The proportion of time that the contacts 45 are closed to the time that these contacts are opened will determine as is well-known, the average value of the field current of the machine 21 and therefore, the average value of the excitation of the generator 14. In the type of regulator shown, it will be apparent that the contacts 45 will be opened when the pull of coil 44 on its core exceeds the weight of the core, and will be closed when the pull of the coil is less than the weight of the core. When the contacts close, the excitation of the generator 21 will be increased, which in turn will increase the excitation and therefore the armature voltage of the pilot generator 40. This higher armature voltage will increase the pull of coil 44, whereby the contacts 45 will be opened. The opening of these contacts will decrease the excitation of the generator 21, and this in turn will lower the voltage of pilot generator 40, which action will decrease the pull exerted by the coil 44 and again the contacts 45 will be closed. Thus, a vibrating action of the lever 42 will be set up, whereby the contacts 45 will be opened and closed in rapid succession, the lever permitting the contacts to remain closed only a sufficient proportion of the time to maintain the pull exerted by the coil 44 substantially constant, which, of course, means that the terminal voltage of the pilot generator 40 will be maintained substantially constant.

Thus, the effect of the regulator 42 is to maintain the voltage of the pilot generator 40 at a substantially constant value, regardless of the speed of this generator, the regulator effecting this operation by adjusting the excitation of the exciter generator 21 which in turn affects the excitation of the pilot generator 40. As will be readily understood by those skilled in the art, various refinements may be added to the regulator 42 to insure rapid vibration, to prevent hunting and to provide means for adjustment, but as these are not essential for the purpose of illustrating the principle of my invention, they are not shown.

It will be evident that the adjustment of the excitation of the exciter generator 21, effected by the regulator 42 to compensate for variations in the speed of pilot generator 40 will affect the excitation of main generator 14 in the same manner as it does that of pilot generator 40. Consequently, the excitation of the main generator 14 will be automatically adjusted to compensate for changes in speed of the flywheel motor-generator set, and for any given position of the master controller 30 a substantially constant voltage will be obtained from the generator 14 regardless of normal speed variations of the flywheel set.

It will be understood that the action of the regulator 42 has no effect upon the exciter 37 which supplies the field winding 12 of the motor 10. Thus, since the motor armature terminal voltage remains substantially constant and since its field excitation likewise remains substantially constant, its speed will be substantially constant for any given setting of the manual controller 30.

In operation, the manual controller 30 will be moved to any desired position as determined by the direction of operation and speed with which it is desired to operate the motor 10, and the field of the generator 14 will be regulated to maintain a substantially constant generator terminal voltage corresponding to the setting of the manual controller 30.

It is to be noted in particular that the pilot generator 40 may be of extremely small proportions as compared with the generator 14 since it has but to supply the energizing current for the coil 44 of the regulator 42. This is made possible because the pilot generator 40 has a field saturation characteristics substantially similar to that of the generator 14. Thus, since the generators 14 and 40 have substantially the same field saturation characteristics, they will be operating at approximately the same portions of their saturation curves at various speeds of the flywheel generator set.

It will be understood that the equipment may be so arranged that after the voltage of the generator 14 has been brought up to its full rated value by the controller 30, the voltage will be maintained substantially constant at this value and the speed of motor 10 may still further be increased by decreasing the excitation of its field 12, either by inserting resistance in this field circuit, or by inserting resistance in the field circuit of exciter 37.

While I have described my invention as embodied in concrete form and operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:

1. The combination with an electrical generator, of an exciter driven at a constant speed for energizing the field winding of said generator, a pilot generator operably associated with said generator and means dependent upon a condition of operation of said pilot generator for regulating said exciter so as to maintain a substantially constant generator voltage.

2. The combination with an electrical generator, of an exciter driven at a substantially constant speed and connected to energize the field winding of said generator, a pilot generator operably associated with said generator and regulating means for said exciter electrically responsive to the speed of said pilot generator, whereby the field of said generator is controlled so as to maintain the terminal voltage thereof substantially constant.

3. The combination with an electrical generator, of a pilot generator having a voltage field current characteristic substantially similar to that of said generator, a common exciter for said generator and said pilot generator and means dependent upon a condition of operation of said pilot generator for regulating said exciter so as to maintain the terminal voltage of said generator substantially constant.

4. In a system of electrical control, a generator, an exciter for energizing the field winding of said generator, a pilot generator operably associated with said generator, the excitation of said pilot generator being controlled by said exciter and means electrically responsive to a condition of operation of said pilot generator for modifying the effect of said exciter so as to regulate the excitation of said generator whereby the terminal voltage thereof is preserved at a substantially constant value.

5. In a system of electrical control, a generator, a pilot generator operated in synchronism with said generator, an exciter for exciting the field windings of said generator and said pilot generator and means responsive to the voltage of said pilot generator for regulating the field strength of said exciter according to the changes in the speed of said generator, whereby the energization of the field winding of said generator is controlled to maintain a substantially constant generator terminal voltage.

6. In a system of electrical control, a generator, a pilot generator operated in synchronism with said generator and an exciter for the field winding of said pilot generator electrically responsive to the terminal voltage of said pilot generator so as to regulate the field thereof to maintain said terminal voltage substantially constant, said exciter serving also to energize the field winding of said generator, whereby said generator field is varied in accordance with variations in the field of said pilot generator.

7. In a system of electrical control, a generator, a pilot generator having voltage field current characteristics substantially similar to those of said generator connected to be operated in synchronism with said generator, a common exciter for energizing the field windings of said generator and said pilot generator and means for regulating the excitation of said common exciter, said means being electrically responsive to the voltage of said pilot generator whereby the terminal voltage of said pilot generator is preserved at a substantially constant value so that the terminal voltage of said generator is likewise preserved at a substantially constant value.

8. In a system of electrical control, a separately excited direct current motor, a generator for supplying the armature current for said motor, a pilot generator having a voltage field current characteristic substantially similar to that of said generator, an exciter for energizing the field windings of said generator and said pilot generator and regulating means electrically responsive to the voltage of said pilot generator for controlling the excitation of said exciter so that the energization of the field winding of said pilot generator is controlled to maintain a substantially constant pilot generator terminal voltage irrespective of its speed, whereby the terminal voltage of the generator likewise is maintained at a substantially constant value.

9. In a system of electrical control, a separately excited direct current motor, a generator for supplying the armature current for said motor, an exciter for energizing the field winding of said generator, a second exciter for energizing the field winding of said first exciter, a pilot generator connected to be operated in synchronism with said generator, and a regulator for varying the exciting effect of said second exciter in response to a condition of operation of said pilot generator, whereby said first exciter is operated to vary the field strength of said generator so as to maintain a substantially constant generator terminal voltage.

10. In a system of electrical control, a direct current motor, an exciter arranged to energize the field winding of said motor, a generator for supplying the armature current for said motor, a second exciter for energizing the field winding of said generator, a third exciter for energizing the field windings of said first and second exciters, a pilot generator operated in synchronism with said generator, and a regulator responsive to the voltage of said pilot generator for varying the exciting effect of said third exciter with respect to said second exciter whereby the field strength of said generator is so varied in accordance with variations in the speed thereof that its terminal voltage is preserved at a substantially constant value.

11. The combination with an electrical generator of control means arranged to adjust the field strength of said generator and to control the polarity thereof, an exciter driven at a substantially constant speed for exciting said generator and regulating means electrically responsive to a condition of operation of said generator for controlling said exciter so as to vary the excitation of said generator in accordance with the response of said reglating means to said operating condition regardless of the adjustment of said control means.

12. The combination with an electrical generator, of control means for the generator field having a plurality of controlling positions, a pilot generator operably associated with said generator, an exciter for exciting said generator and said pilot generator and means electrically responsive to a condition of operation of said pilot generator for modifying the effect of said exciter so as to regulate the excitation of said generator whereby a predetermined terminal voltage thereof is maintained for each position of said control means.

13. In a system of motor control, a separately excited direct current motor, a separately excited direct current generator for supplying the armature current for said motor, control means arranged to adjust the field strength of said generator and to control the polarity thereof so as to control the speed and direction of operation of said motor, a second generator driven in synchronism with said first generator, a common source of excitation for said generators, and regulating means electrically responsive to a condition of operation of said second generator for controlling said excitation source in accordance with the response of said regulating means to said operating condition regardless of adjustment of said control means.

14. A system of motor control comprising, a separately excited direct current motor, a generator for supplying the armature current for said motor, an exciter driven at a substantially constant speed for energizing the field winding of said generator, control means comprising a multi-position controller arranged to adjuts the field strength of said generator and to control the polarity thereof and means for regulating said exciter responsively to the speed of said generator, whereby a substantially constant predetermined generator voltage is maintained for each position of said multi-position controller.

15. A system of motor control comprising, a separately excited direct current motor, a generator for supplying the armature current for said motor, a substantially constant potential source of excitation for said motor, an exciter for energizing the field winding of said generator, control means comprising a multi-position controller arranged to adjust the field strength of said generator and to control the polarity thereof so as to control the speed and direction of operation of said motor, a pilot generator operated in synchronism with said generator, the excitation of said pilot generator being controlled by said exciter and means for regulating the field strength of said exciter responsively to the voltage of said pilot generator, whereby the field strength of said generator is controlled to maintain the terminal voltage thereof and consequently the speed of said motor substantially at the value determined by the adjustment of said multi-position controller.

In witness whereof, I have hereunto set my hand this 26th day of October 1928.

HARRY A. WINNE.